US009436838B2

(12) United States Patent
Li et al.

(10) Patent No.: US 9,436,838 B2
(45) Date of Patent: Sep. 6, 2016

(54) SECURE LOCAL WEB APPLICATION DATA MANAGER

(71) Applicant: Intel Corporation, Santa Clara, CA (US)

(72) Inventors: Hong C. Li, El Dorado Hills, CA (US); Mark D. Boucher, San Jose, CA (US); Conor P. Cahill, Waterford, VA (US); Manohar R. Castelino, Santa Clara, CA (US); Steve Orrin, Santa Clara, CA (US); Vinay Phegade, Beaverton, OR (US); John E. Simpson, Jr., Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/721,912

(22) Filed: Dec. 20, 2012

(65) Prior Publication Data

US 2014/0181888 A1    Jun. 26, 2014

(51) Int. Cl.
*H04L 29/06* (2006.01)
*G06F 21/62* (2013.01)

(52) U.S. Cl.
CPC .................................... *G06F 21/62* (2013.01)

(58) Field of Classification Search
CPC ... G06F 21/6218; G06F 21/62; H04L 63/101
USPC .......................................... 726/1–4; 713/193
See application file for complete search history.

(56) References Cited

U.S. PATENT DOCUMENTS

| 6,366,912 B1* | 4/2002 | Wallent et al. | |
| 6,567,918 B1* | 5/2003 | Flynn et al. | 726/7 |
| 7,076,652 B2* | 7/2006 | Ginter | G06F 21/10 348/E6.006 |
| 7,143,066 B2* | 11/2006 | Shear | G06Q 20/3674 705/54 |
| 7,571,459 B2* | 8/2009 | Ganesh et al. | 726/1 |
| 7,836,497 B2* | 11/2010 | Hossain | H04L 45/586 726/1 |
| 8,230,060 B2* | 7/2012 | Sharabani | 709/224 |
| 2002/0099952 A1* | 7/2002 | Lambert et al. | 713/200 |
| 2004/0006706 A1* | 1/2004 | Erlingsson | 713/200 |
| 2005/0246761 A1* | 11/2005 | Ross et al. | 726/1 |

(Continued)

FOREIGN PATENT DOCUMENTS

WO    2012048087 A2    4/2012

OTHER PUBLICATIONS

Good Technology, Inc., 'Good Mobile Access (Secure Browser) Guide [A Component of Good for Enterprise]', Good Technology, Inc., Oct. 28, 2014, entire document, https://media.good.com/documents/SecureBrowser.pdf.*

(Continued)

*Primary Examiner* — Luu Pham
*Assistant Examiner* — Ronald Baum
(74) *Attorney, Agent, or Firm* — Jordan IP Law, LLC (57) ABSTRACT

Apparatus, systems and methods may provide a browser interface to detect an attempt by web content to manipulate data in a local data store. In addition, the data may be classified into a category if the data is remotely accessible. Additionally, a security policy may be applied to the data based on the category. In one example, a separator may separate the data from other data based on the category, the data may be encrypted/decrypted based on the category, and/or context information and user input may be determined to apply the security policy further based on the context information and the user input.

22 Claims, 4 Drawing Sheets

(56) References Cited

U.S. PATENT DOCUMENTS

| | | | |
|---|---|---|---|
| 2006/0064301 A1* | 3/2006 | Aguilar et al. | 704/233 |
| 2006/0085848 A1* | 4/2006 | Aissi et al. | 726/9 |
| 2006/0090084 A1* | 4/2006 | Buer | 713/189 |
| 2006/0136735 A1* | 6/2006 | Plotkin | G06F 21/85 713/182 |
| 2007/0113266 A1* | 5/2007 | Ross et al. | 726/1 |
| 2008/0010683 A1 | 1/2008 | Baddour et al. | |
| 2008/0153468 A1 | 6/2008 | Reilly | |
| 2009/0094456 A1* | 4/2009 | Ruggiero | H04L 9/3247 713/168 |
| 2009/0113532 A1* | 4/2009 | Lapidous | 726/7 |
| 2012/0026881 A1 | 2/2012 | Zuk et al. | |
| 2012/0047425 A1 | 2/2012 | Ahmed | |
| 2012/0216296 A1* | 8/2012 | Kidron | G06F 17/30867 726/28 |
| 2014/0173692 A1* | 6/2014 | Srinivasan | H04W 12/02 726/4 |

OTHER PUBLICATIONS

Citrix Systems, Inc., 'XenMobile Technology Overview', 2015, Citrix Systems, Inc., entire document, https://www.citrix.com/content/dam/citrix/en_us/documents/products-solutions/citrix-xenmobile-technology-overview.pdf.*

International Search Report and Written Opinion received for PCT Patent Application No. PCT/US2013/074090, mailed on Mar. 20, 2014, 12 pages.

Office Action Received for the Korean Patent Application No. 2015-7013123, mailed on Mar. 16, 2016, 7 pages.

Law, Eric, "Same Origin Policy Part 1: No Peeking," Aug. 28, 2009, Retrieved from blogs.msdn.microsoft.com/ieinternals/2009/08/28/same-origin-policy-part-1-no-peeking/, 6 pages.

Extended Search Report for European Patent Application No. 13865678.0, mailed on Jul. 7, 2016, 8 pages.

* cited by examiner

SECURE LOCAL WEB APPLICATION DATA MANAGER

BACKGROUND

Embodiments generally relate to secure local web application data management. More particularly, embodiments relate to the classification of data into a category if the data is remotely accessible, and/or to the implementation of a security policy to the data based on the classification.

Emerging markup languages such as HTML5 (Hypertext Markup Language 5, e.g., HTML5 Editor's Draft 8 May 2012, W3C), LLVM (e.g., LLVM 3.1, May 22, 2012, 11vm.org), and other runtime or just in time (JIT) environment languages may support more robust multimedia related web platform development. The use of these advanced languages, however, may also expose end user platform components such as local graphics processors, memory, sensors, and so forth, to web applications, wherein the exposure of such components may lead to security concerns.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
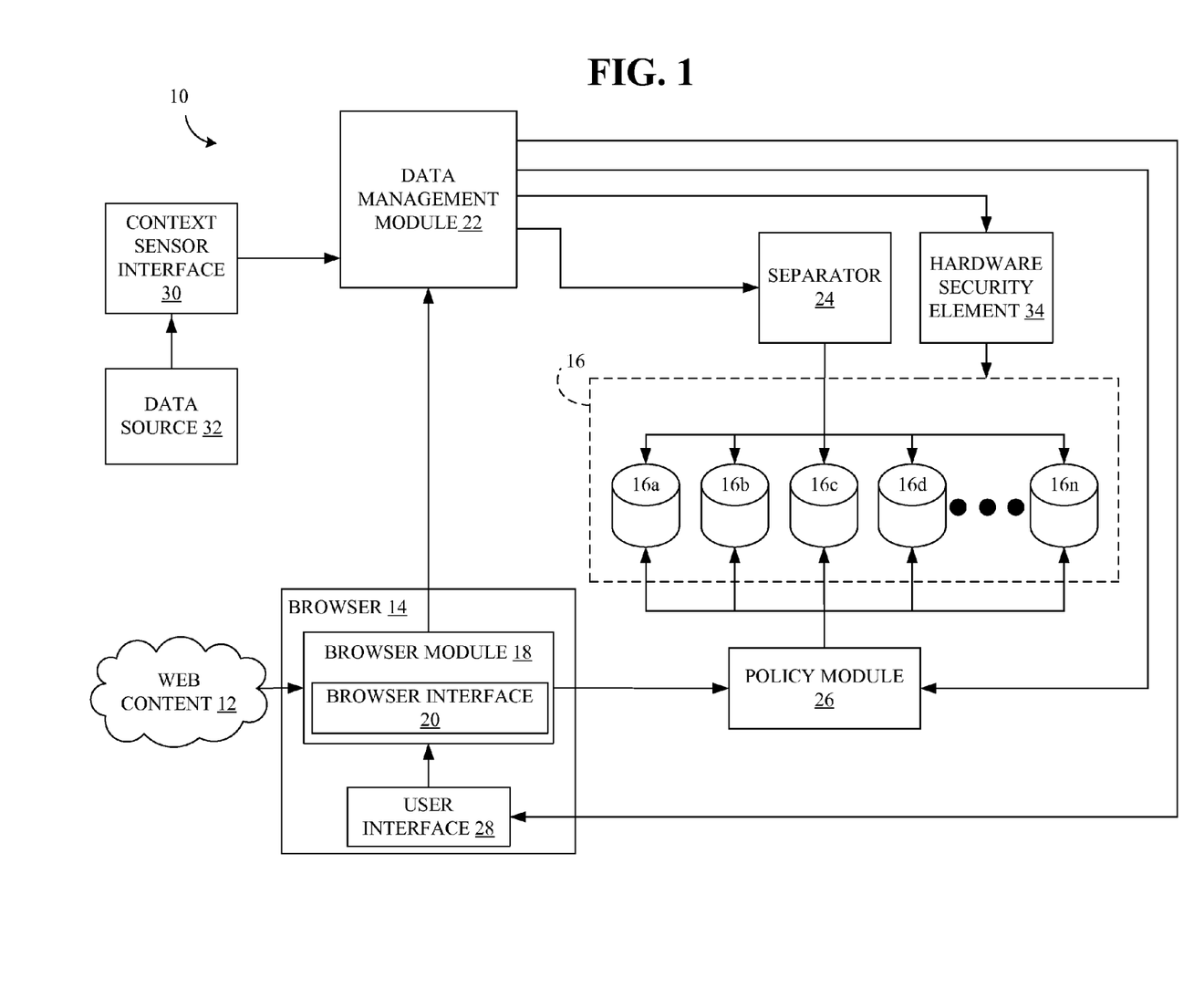
FIG. 1 is a block diagram of an example of a local data manager according to an embodiment.

Turning now to FIG. 1, a local data manager 10 is shown according to an embodiment. In the illustrated example, a user obtains web content 12 (e.g., web pages, applications, multimedia, etc.) via a browser 14. The local data manager 10 and/or the browser 14 may execute on a platform such as, for example, a desktop computer, workstation, notebook computer, smart tablet, smart phone, personal digital assistant (PDA), media player, imaging device, etc., or combinations thereof. In one example, one or more components of the local data manager 10 and/or the browser 14 may be implemented in a browser independent client application, plug-in, Operating System (OS), firmware, hardware, or combinations thereof. The browser 14 may be associated with a local data store 16 that resides on-platform, off-platform, or combinations thereof. Of particular note is that the web content 12 may have access to the local data store 16 by virtue of the web content 12 being written in a runtime and/or JIT environment language, which exposes platform hardware, such as Hypertext Markup Language 5 (HTML5), Java, JavaScript, C#, and so on, or combinations thereof.

The local data manager 10 may include a browser module 18 having a browser interface 20. In the illustrated example, the browser interface 20 detects an attempt by the web content 12 to manipulate data in the local data store 16. For example, the browser interface 20 may monitor a web application, such as an HTML5 web application, to detect the manipulation attempt by the web content 12. The manipulation attempt may include one or more operations that attempt to read from and/or write to the data in the local data store 16, such as an operation involving data in local storage (e.g., HTML5 Web Storage), cache (e.g., HTML5 Application Cache), memory, hard drives, graphics hardware, and so on, or combinations thereof. Accordingly, a user may launch a web application or service that includes a request to operate on the data in the local storage 16 (e.g., change an offline cache), which is intercepted by the browser interface 20. As will be discussed in greater detail, undesired manipulation attempts by a web application may be prevented in the example shown.

The local data manager 10 may additionally include a data management module 22 to categorize the data in the local store 16 if the data is remotely accessible. More particularly, the data management module 22 may select one or more categories from a plurality of categories to classify the data. For example, a privacy category may be selected to classify privacy data that has been determined to be remotely accessible, such as remotely accessible browsing history data, personal data, and so on, or combinations thereof. A cryptographic category may also be selected to classify cryptographic data that has been determined to be remotely accessible, such as remotely accessible username information, password information, challenge information, and so on, or combinations thereof. Additionally, an application specific category may be selected to classify application specific data that has been determined to be remotely accessible, such as remotely accessible webmail data, retail data, auction data, and so on, or combinations thereof. Other categories may also be used, depending upon the circumstances. Moreover, one or more of the categories may be preselected, may be determined by employing a training process (e.g., training data), or combinations thereof. In one example, the selected category may be determined by adaptively recognizing the type of data from identifying information, such as a web link address (e.g., source), elements, tags, and so on, or combinations thereof.

In addition, the data management module 22 may implement a separator 24 to separate the remotely accessible data from other data. In one example, the separator 24 may separate remotely accessible web data from other web data, such as web data that is not remotely accessible. In addition, the separator 24 may separate the data in the local data store 16 based on the selected category. For example, the separator 24 may separate privacy data based on the classification of the data in a privacy category, cryptographic data based on the classification of the data in a cryptographic category, application specific data associated with a first application based on the classification of the data in a first application specific category, application specific data associated with a second application based on the classification of the data in a second applications specific category, and so on, or combinations thereof.

In the illustrated example, the data may be separated and stored in the local data store 16 on a partitioned basis. In this regard, the local data store 16 may include a plurality of storage regions 16a-16n corresponding to the plurality of categories. For example, the local data store 16 may include one or more storage regions 16a corresponding to the privacy category, one or more storage regions 16b corresponding to the cryptographic category, one or more storage regions 16c,16d corresponding to the first and the second application specific categories, respectively, and so on, or combinations thereof. The storage regions 16a-16n may be on the same or separate physical or virtual storage on the same or separate platforms, or combinations thereof. For example, the storage regions 16a and 16b may be on the same physical memory, the storage region 16c may be on a hard disk of the same platform where the physical memory is located, and the storage 16d may be on an off-platform removable media storage (e.g., flash drive).

Additionally, the local data manager 10 may include a policy module 26 to apply a security policy to the data stored in the local data storage 16 based on the categories. Generally, the security policy may be employed to prevent unintended accesses, malicious actions and/or attacks. For example, the policy module 26 may determine whether to permit access attempts by the web content 12, which may be detected by browser interface 20, using a security policy based on the categories. The security policy may be predetermined, determined in real-time, and/or determined by combinations thereof. Moreover, a security policy may be established from any source, such as from user input, context information associated with the platform, an enterprise policy from an organization's information technology (IT) department, a multi-user (e.g., community) data source or other cloud service via a communication link, and so on, or combinations thereof. Also, the security policy may be established at any component of the local data manager 10, for example at the browser module 18, the data management module 22, the policy module 26, and so on, or combinations thereof.

The user input employed to apply a security policy may be in any form, for example in the form of a profile that is configurable by the user and/or administrator. In the illustrated example, a user interface 28 of the browser 14 may provide the user input to the browser interface 20, which may forward the information to the policy module 26. The user input may be obtained from a communication link, and may be forwarded directly from the communication link and/or the user interface 28 to any component of the local data manager 10, such as the policy module 26, memory, storage, and so on, or combinations thereof. In one example, the policy module 26 applies a security policy based on a category and further based on user input received via the user interface 28, which may permit attempts by a particular type of JavaScript (JS) application to access a type of data (e.g., privacy data, etc.) in the local data storage 16 (e.g., storage region 16a, etc.) based on a category (e.g., privacy category, etc.) and deny attempts by another type of web application to access the data (e.g., privacy data, etc.) in the local data storage 16 (e.g., storage region 16a) based on the category (e.g., privacy category, etc.).

In another example, the policy module 26 may apply a security policy based on a category and further based on user input, which may deny access by the particular type of JS application to a type of data (e.g., cryptographic data, etc.) in the local data storage 16 (e.g., storage region 16b, etc.) based on a category (e.g., cryptographic category, etc.), even though it may have access to another type of data (e.g., privacy data, etc.) in the local data storage 16 (e.g., storage region 16a, etc.) based on another category (e.g., privacy category, etc.). In yet another example, the user input may establish a security policy in which web content from a particular site may be denied and/or allowed access to a type of data in a local data storage based a category and user input. For example, the policy module 26 may permit access by content of a particular web site (e.g., www*website1*com) to a type of data (e.g., privacy data) in the local data storage 16 (e.g., storage region 16a) based on a category (e.g., privacy category) and deny access by another web site (e.g., www*website2*com) to the data (e.g., privacy data) in the local data storage 16 (e.g., storage region 16a) based on the category (e.g., privacy category).

Additionally, the local data manager 10 may include a context sensor interface 30 to determine context information related to the platform, such that the security policy may be applied to the data further based on platform context information. In the illustrated example, a data source 32 may provide data to the context sensor interface 30 to determine context information. The data source 32 may provide context information associated with the platform, an enterprise policy from an organization's IT department, a multi-user (e.g., community) data source or other cloud service via a communication link, and so on, or combinations thereof. In one example, the context information includes data related to the geolocation of the platform, the hardware of the platform, the software of the platform, the use of the platform, and so on, or combinations thereof. The context sensor interface 30 may forward the context information to the data management module 22, which may provide the context information and/or the security policy to the policy module 26 on encountering a manipulation attempt detected by the browser interface 20. The context information may also be automatically and/or directly forwarded to any component of the local data manager 10, such as the policy module 26.

The context sensor interface 30 may determine location information related to the platform from one or more WiFi (Wireless Fidelity, e.g., Institute of Electrical and Electronics Engineers/IEEE 802.11-2007, Wireless Local Area Network/LAN Medium Access Control (MAC) and Physical Layer (PHY) Specifications) sensors, global positioning system (GPS) sensors, global system for mobile communications (GSM) sensors, cellular sensors, near field communication sensors, audio sensors, motion sensors, and so on, or combinations thereof. In one example, the policy module 26 may apply a security policy based on a category and further based on location context information associated with the platform (e.g., home, work, geographic coordinates, etc.), which may permit attempts by the web content 12 to access a type of data (e.g., privacy data, etc.) in the local data storage 16 (e.g., storage region 16a, etc.) based on a category (e.g., privacy category, etc.) when the platform is at the location (e.g., home, etc.), and deny attempts by the web content 12 to access another type of the data (e.g., cryptographic data, etc.) in the local data storage 16 (e.g., storage region 16b, etc.) based on another category (e.g., cryptographic category, etc.) when the platform is at the location (e.g., home). In another example, the security policy may permit attempts by the web content 12 to access a type of data (e.g., cryptographic data, etc.) based on a category (e.g., cryptographic category, etc.) when the platform is at yet another location (e.g., work, etc.).

The context sensor interface 30 may also determine context information associated with hardware of the platform. The hardware information may include unique identifying platform address information, such as an international mobile equipment identification (IMEI) number, a media access control (MAC) address, an internet protocol (IP) address, and so on, or combinations thereof. The hardware information may also include platform component information, such as information associated with platform memory, storage, sensors, communication cards, displays, and so on, or combinations thereof. In one example, the policy module 26 applies a security policy based on a category and further based on hardware information (e.g., MAC address, memory, etc.) associated with the platform, which may permit attempts by the web content 12 to access a type of data (e.g., privacy data, etc.) in the local data storage 16 (e.g., storage region 16a, etc.) based on a category (e.g., privacy category, etc.) when the platform is employing the platform hardware associated with the hardware information (e.g., MAC address, memory, etc.). In another example, the security policy may deny attempts by the web content 12 to access another type of the data (e.g., cryptographic data, etc.) in the local data storage 16 (e.g., storage region 16b, etc.) based on another category (e.g., cryptographic category, etc.) when the platform is employing the same platform hardware associated with the hardware information (e.g., the same MAC address, memory, etc.).

The context sensor interface 30 may further determine context information associated with software of the platform. The software information may include data associated with platform browser types, applications, programming languages, OS types, drivers, and so on, or combinations thereof. In one example, the policy module 26 may apply a security policy based on a category and further based on software information (e.g., browser type, etc.) associated with the platform, which may permit attempts by the web content 12 to access a type of data (e.g., privacy data, etc.) in the local data storage 16 (e.g., storage region 16a, etc.) based on a category (e.g., privacy category, etc.) when the platform is employing specific platform software (e.g., specific browser type, etc.). In addition, the security policy may deny attempts by the web content 12 to access another type of the data (e.g., cryptographic data, etc.) based on another category (e.g., cryptographic category, etc.) when the platform is employing the specific platform software (e.g., the specific browser type, etc.). Additionally, the security policy may permit attempts by the web content 12 to access a type of data (e.g., cryptographic data, etc.) based on a category (e.g., cryptographic category, etc.) when the platform is employing another specific platform software (e.g., another specific browser type).

The context sensor interface 30 may further determine context information associated with use of the platform. The use of the platform may include work use, personal use, and so on, or combinations thereof. In one example, the policy module 26 may apply a security policy based on a category and further based on use of the platform (e.g., personal use, etc.), which may permit attempts by the web content 12 to access a type of data (e.g., privacy data, etc.) in the local data storage 16 (e.g., storage region 16a, etc.) based on a category (e.g., privacy category, etc.) when the platform is employed for a particular use (e.g., personal use). In addition, the security policy may deny attempts by the web content 12 to access another type of the data (e.g., cryptographic data, etc.) based on another category (e.g., cryptographic category, etc.) when the platform is employed for the same particular type of use (e.g., personal use). Moreover, the security policy may permit attempts by the web content 12 to access a type of data (e.g., cryptographic data, etc.) based on a category (e.g., cryptographic category, etc.) when the platform is employed for another type of use (e.g., work use, etc.) and deny access to another type of data (e.g., privacy data) when the platform is employed for the same type of use (e.g., work use, etc.).

Additionally, the local data manager 10 may include a hardware security element 34 to encrypt/decrypt the data in the local data store 16. In the illustrated example, the data management module 22 uses the hardware security element 34 to perform an encryption process (e.g., encrypt and/or decrypt) on the data in the local data storage 16 (e.g., storage regions 16a-16n). The encryption process may be predetermined, adaptive, and/or based on one or more categories. For example, the data management module 22 may implement the hardware security element 34 to automatically encrypt all of the data stored in the local data storage 16, may instruct the hardware security element 34 to selectively encrypt the data stored in the local storage 16 based on the category, and so on, or combinations thereof.

The encryption process may be software assisted, hardware assisted, and so on, or combinations thereof. For example, the encryption process may be accomplished using any encryption algorithm, such as Rivest Shamir Adleman (RSA) algorithm, secure hash algorithm (SHA), message-digest algorithm (MD5), Advanced Encryption Standard (AES), Advanced Encryption Standards New Instructions (AES-NI), and so on, or combinations thereof. In one example, it may be predetermined that all of the data stored in the local data storage 16 is to be encrypted/decrypted by the hardware security element 34 on instruction from the data management module 22. In another example, it may be adaptively determined that only one type of data (e.g., privacy data) may be encrypted/decrypted based on a category (e.g., privacy category), that one type of data (e.g., privacy data) may be encrypted/decrypted with one type of encryption algorithm (e.g., AES-NI) that is different from another encryption algorithm (e.g., AES) used for another type of data (e.g., cryptography data), and so on, or combinations thereof.

Additionally, the local data manager 10 may provide a report to the user, to the administrator, to any security authority (e.g., network management platform, data analyzer, intrusion detection system, etc.), and so on, or combinations thereof. In the illustrated example, the report is rendered by the data management module 22 to the user via the user interface 28. The report may be in textual form, graphical form, machine-readable form, and so on, or combinations thereof. The report may be provided on a display, such as a platform light-emitting diode (LED) display, stored, communicated over any communications link (e.g., via WiFi), and so on, or combinations thereof. The report may include a description of the data that has been attempted to be read, stored and/or modified in the local data store 16, the source of the attempt to operate on the data, recommended actions to be taken, actions taken, and so on, or combinations thereof. In one example, the report includes a description of the data that has been stored (e.g., description of the data together with the category), the source of the attempt to operate on the data (e.g., source of the web content 12), recommended actions (e.g., classify data, separate data, establish a security policy, employ a security policy, apply encryption process, etc.), and/or actions taken (e.g., data classified, data separated, security policy applied, user input and/or context information employed, encryption process applied, etc.).

The security report may be established at any component of the local data manager 10, such as at the browser module 18, the data management module 22, the policy module 26, and so on, or combinations thereof. Moreover, while examples have illustrated separate interfaces, modules, and elements, it is apparent that one or more of the modules, interfaces and/or elements presented herein may be implemented in one or more combined modules, interfaces and/or elements. Accordingly, for example, the browser interface 20, the data management module 22, the separator 24, the context sensor interface 30, the hardware security element 34, and/or the policy module 26 may be implemented in a combined module, interface and/or element in any combinations thereof.

Figure 2:
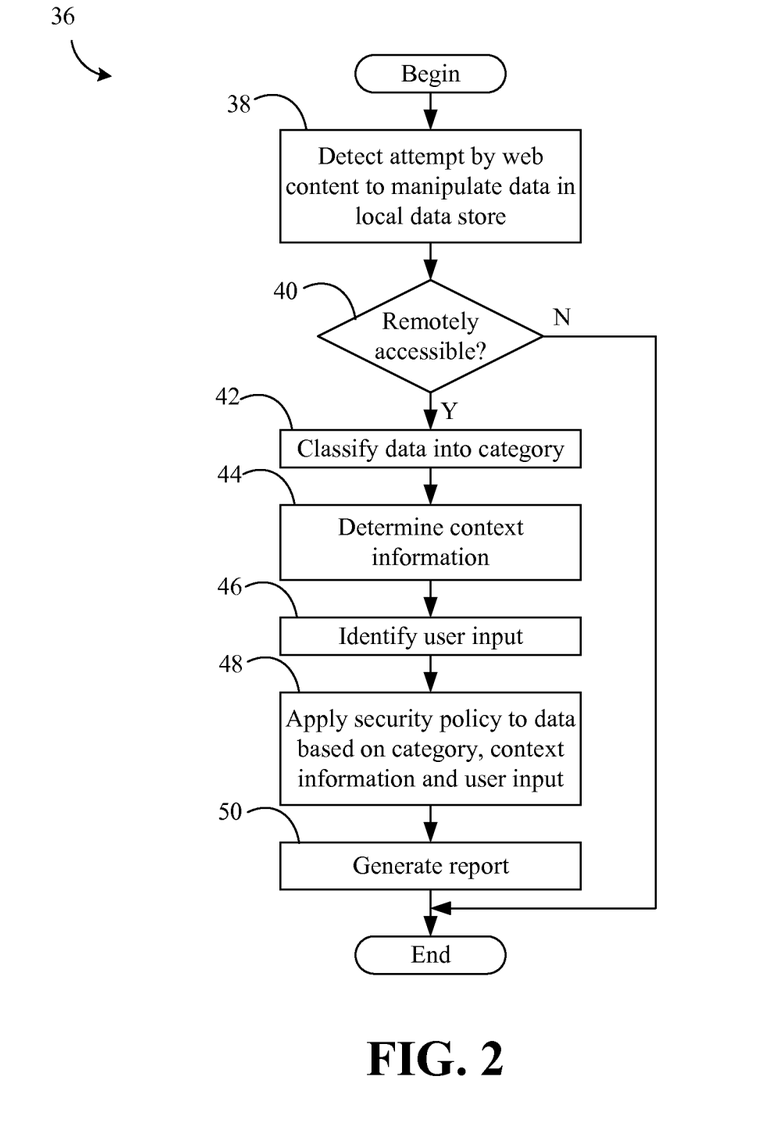
FIG. 2 is a flowchart of an example of a method of managing security in a web based environment according to an embodiment.

Turning now to FIG. 2, a method 36 of managing security in a web based environment is shown according to an embodiment. The method 36 may be implemented as a set of logic instructions and/or firmware stored in a machine- or computer-readable medium such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 36 may be written in any combination of one or more programming languages, including an object oriented programming language such as C++ or the like and conventional procedural programming languages, such as the "C" programming language or similar programming languages. Moreover, the method 36 may be implemented as the local data manager 10 (FIG. 1) using any of the herein mentioned circuit technologies.

Illustrated processing block 38 provides for detecting an attempt by web content to manipulate data in a local data store. In one example, the web content may be written in a runtime and/or JIT environment language which exposes platform hardware, such as HTML5, Java, JavaScript, C#, and so on, or combinations thereof. Block 40 provides for determining if the data in the local data store is remotely accessible. For example, the data may be remotely accessible if it is associated with an operation involving remote access to data in local storage (e.g., HTML5 Web Storage), cache (e.g., HTML5 Application Cache), memory, hard drives, graphics, and so on, or combinations thereof. If it is determined that the data is not remotely accessible, the method 36 may terminate.

If, on the other hand, it is determined that the data is remotely accessible, illustrated processing block 42 provides for classifying the data into one or more categories. The data may be classified prior to, during, and/or after the manipulation attempt is generated, received, and/or detected. In one example, the data may be automatically classified and stored when the data is generated and/or received irrespective of the manipulation attempt. In another example, the data may be retrieved, classified and stored after a request to operate on the data is received and/or detected. Classifying the data may include selecting the category from a plurality of categories, such as, but not limited to, a privacy category, a cryptographic category, an application specific category, an organization (e.g., company) confidentiality specification, and so on, or combinations thereof. In addition, classifying the data may be accomplished by an untrained classifier, for example using preconfigured settings or by prompting the user to establish categories with or without policy configurations (e.g., initial configurations). Classifying the data may also be accomplished by a trained classifier based on the source of the data, the type of data, the attributes of the data, the elements of the data, and so on, or combinations thereof.

Additionally, the data may be separated from other data prior to, during, and/or after being classified. In one example, data that is determined to be remotely accessible may be separated from other data (e.g., data that is not remotely accessible) before being classified. In addition, the data may be separated from other data in the local data store based on the category. For example, one type of data that is classified may be separated from another type of data that is classified based on their respective categories. In addition, the local data store may include a plurality of regions corresponding to the plurality of categories, such that the data that is classified may be stored in respective storage regions corresponding to the categories.

Illustrated processing block 44 provides for determining context information to establish the security policy. The context information may include information related to the platform, such as information associated with the geolocation of the platform, the hardware of the platform, the software of the platform, the use of the platform, and so on, or combinations thereof. In addition, illustrated processing block 46 provides for identifying user input to establish the security policy. The user input may be provided via any platform software interface, such as a browser setting, a real-time dialog, and so on, or combinations thereof. The user input may also be provided via any platform hardware interface, such as a touch screen, a mouse, a keyboard, a communication interface (e.g., via a WiFi network interface card).

Illustrated processing block 48 provides for applying the security policy based on the category, context information and the user input. In one example, the security policy may be established to allow and/or deny web content the access to one or more types of data based on one or more categories and further based on the context information and/or user input, which may be adaptively determined. In addition, the security policy may be applied to encrypt and/or decrypt the data, for example using a hardware assisted encryption algorithm. Additionally, the illustrated processing block 50 provides for generating a report, which may identify the source of the web content, the context information, the user input, the policy, recommended actions, actions taken, and so on, or combinations thereof.

Figure 3:
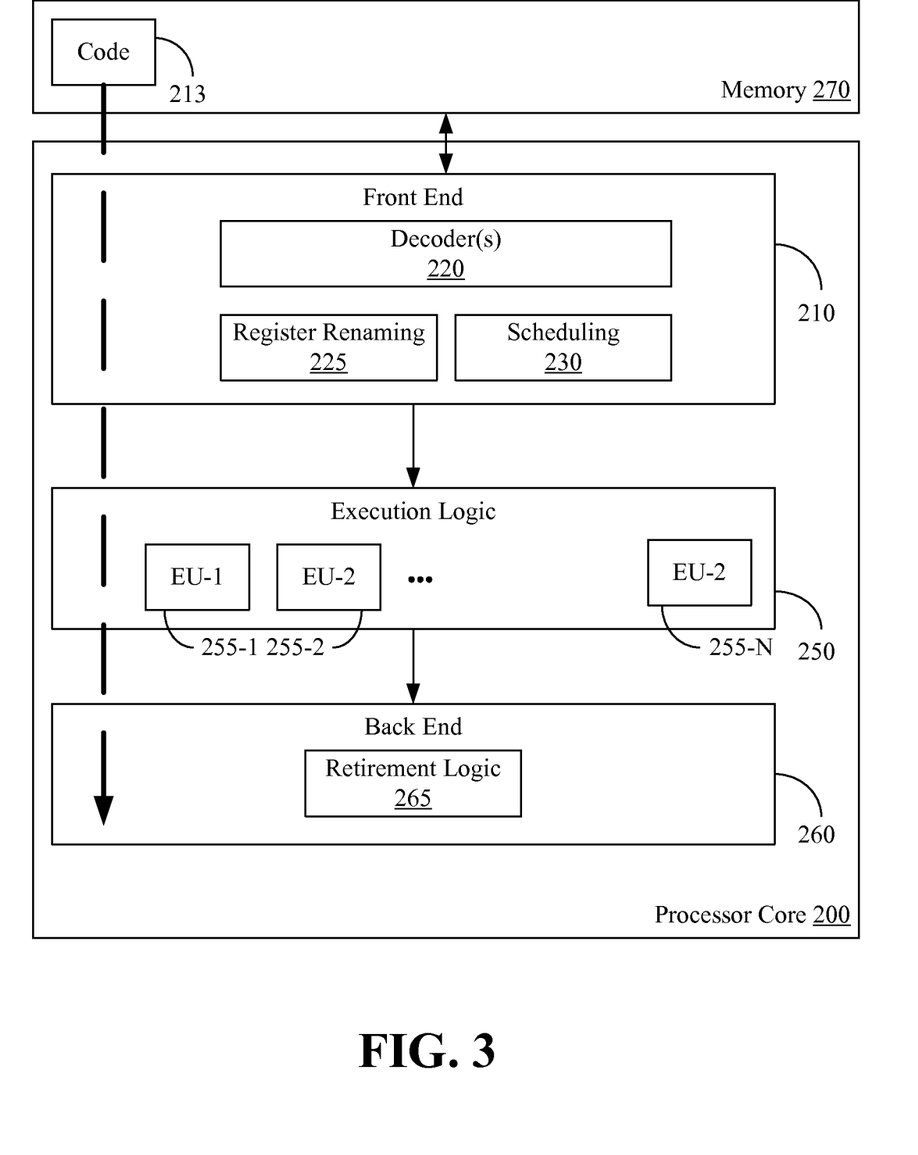
FIG. 3 is a block diagram of an example of a processor according to an embodiment.

FIG. 3 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 3, a processing element may alternatively include more than one of the processor core 200 illustrated in FIG. 3. The processor core 200 may be a single-threaded core or, for at least one embodiment, the processor core 200 may be multithreaded in that it may include more than one hardware thread context (or "logical processor") per core.

FIG. 3 also illustrates a memory 270 coupled to the processor 200. The memory 270 may be any of a wide variety of memories (including various layers of memory hierarchy) as are known or otherwise available to those of skill in the art. The memory 270 may include one or more code 213 instruction(s) to be executed by the processor 200 core, wherein the code 213 may implement the local data manager 10 (FIG. 1), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 also includes register renaming logic 225 and scheduling logic 230, which generally allocate resources and queue the operation corresponding to the convert instruction for execution.

The processor 200 is shown including execution logic 250 having a set of execution units 255-1 through 255-N. Some embodiments may include a number of execution units dedicated to specific functions or sets of functions. Other embodiments may include only one execution unit or one execution unit that may perform a particular function. The illustrated execution logic 250 performs the operations specified by code instructions.

After completion of execution of the operations specified by the code instructions, back end logic 260 retires the instructions of the code 213. In one embodiment, the processor 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 3, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 4:
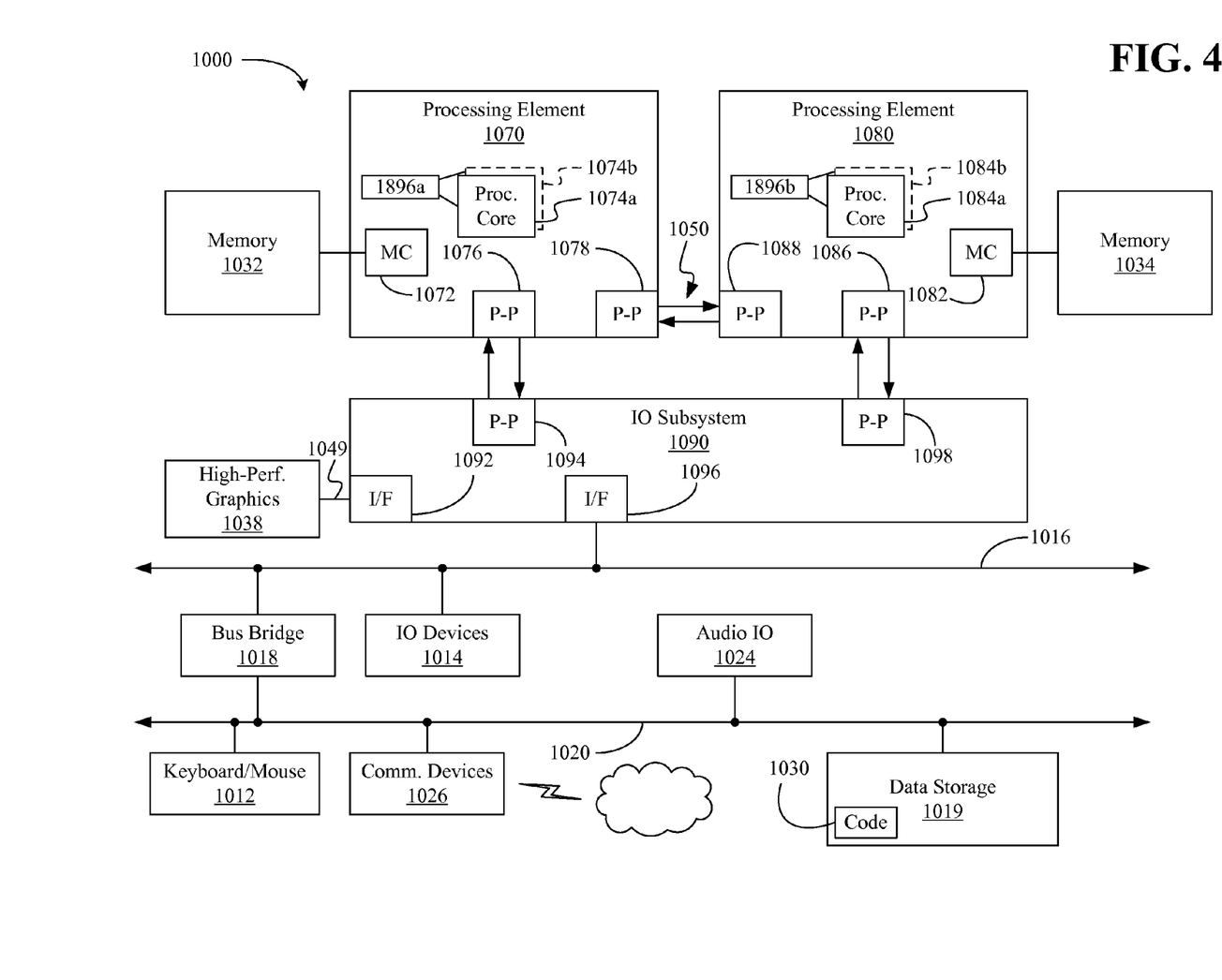
FIG. 4 is a block diagram of an example of a system according to an embodiment.

Referring now to FIG. 4, shown is a block diagram of a system 1000 in accordance with an embodiment of the present invention. Shown in FIG. 4 is a multiprocessor system 1000 that includes a first processing element 1070 and a second processing element 1080. While two processing elements 1070 and 1080 are shown, it is to be understood that an embodiment of system 1000 may also include only one such processing element.

System 1000 is illustrated as a point-to-point interconnect system, wherein the first processing element 1070 and second processing element 1080 are coupled via a point-to-point interconnect 1050. It should be understood that any or all of the interconnects illustrated in FIG. 4 may be implemented as a multi-drop bus rather than point-to-point interconnect.

As shown in FIG. 4, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 3.

Each processing element 1070, 1080 may include at least one shared cache 1896. The shared cache 1896a, 1896b may store data (e.g., instructions) that are utilized by one or more components of the processor, such as the cores 1074a, 1074b and 1084a, 1084b, respectively. For example, the shared cache may locally cache data stored in a memory 1032, 1034 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the present invention is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are hetero-geneous or asymmetric to processor a first processor 1070, accelerators (such as, e.g., graphics accelerators or digital signal processing (DSP) units), field programmable gate arrays, or any other processing element. There may be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

First processing element 1070 may further include memory controller logic (MC) 1072 and point-to-point (P-P) interfaces 1076 and 1078. Similarly, second processing element 1080 may include a MC 1082 and P-P interfaces 1086 and 1088. As shown in FIG. 4, MC's 1072 and 1082 couple the processors to respective memories, namely a memory 1032 and a memory 1034, which may be portions of main memory locally attached to the respective processors. While the MC logic 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076, 1086 and 1084, respectively. As shown in FIG. 4, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple graphics engine 1038 to I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the present invention is not so limited.

As shown in FIG. 4, various I/O devices 1014 may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. In one example, web content is received via the communication devices 1026. The code 1030 may include instructions for performing embodiments of one or more of the methods described above. Thus, the illustrated code 1030 may implement the local data manager 10 (FIG. 1) and may be similar to the code 213 (FIG. 3), already discussed. Further, an audio I/O 1024 may be coupled to second bus 1020.

Note that other embodiments are contemplated. For example, instead of the point-to-point architecture of FIG. 4, a system may implement a multi-drop bus or another such communication topology. Also, the elements of FIG. 4 may alternatively be partitioned using more or fewer integrated chips than shown in FIG. 4.

ADDITIONAL NOTES AND EXAMPLES

Example 1 may include subject matter such as a security apparatus to perform a method of managing security in a web based environment, means for performing acts, or a machine readable medium including instructions that when performed by a machine causes the machine to perform acts related to managing security in a web based environment, where the apparatus comprises a browser interface to detect an attempt by web content to manipulate data in a local data store; a data management module to classify the data into a category if the data is remotely accessible; and a policy module to apply a security policy to the data based on the category.

Example 2 includes the subject matter of Example 1 and further includes a separator to separate the data from other data in the local data store based on the category.

Example 3 includes the subject matter of either Example 1 or Example 2 and further optionally is to select the category from a plurality of categories including one or more of privacy, cryptographic, organization confidentiality specification, and application specific.

Example 4 includes the subject matter of any of Example 1 to Example 3 and further includes a context sensor interface to determine context information for the apparatus.

Example 5 includes the subject matter of any of Example 1 to Example 4 and further optionally is to apply the security policy to the data further based on the context information.

Example 6 includes the subject matter of any of Example 1 to Example 5 and further optionally is to receive user input and apply the security policy to the data further based on the user input.

Example 7 includes the subject matter of any of Example 1 to Example 6 and further includes a hardware security element.

Example 8 includes the subject matter of any of Example 1 to Example 7 and further optionally is to instruct a hardware security element to encrypt the data in the local data store.

Example 9 includes the subject matter of any of Example 1 to Example 8 and further optionally includes generating a report that identifies the attempt, the category and the security policy.

Example 10 includes the subject matter of any of Example 1 to Example 9 and further optionally includes monitoring a Hypertext Markup Language 5 (HTML5) web application to detect the attempt, and/or any other web content written in a runtime and/or JIT environment language, including and not limited to Java, JavaScript, C#, and so on, or combinations thereof.

Example 11 includes the subject matter of any of Example 1 to Example 10 and further includes a local data store.

Example 12 is a method of managing security in a web based environment, where the method comprises detecting an attempt by web content to manipulate data in a local data store; classifying the data into a category if the data is remotely accessible; and applying a security policy to the data based on the category.

Example 13 includes the subject matter of Example 12 and further includes separating the data from other data in the local data store based on the category.

Example 14 includes the subject matter of either Example 12 or Example 13 and further optionally includes selecting the category from a plurality of categories including one or more of privacy, cryptographic, organization confidentiality specification, and application specific.

Example 15 includes the subject matter of any of Example 12 to Example 14 and further includes determining context information for a device containing the local data store.

Example 16 includes the subject matter of any of Example 12 to Example 15 and further optionally includes applying the security policy to the data further based on the context information.

Example 17 includes the subject matter of any of Example 12 to Example 16 and further optionally includes receiving user input and applying the security policy to the data further based on the user input.

Example 18 includes the subject matter of any of Example 12 to Example 17 and further optionally includes instructing a hardware security element to encrypt the data in the local data store.

Example 19 includes the subject matter of any of Example 12 to Example 18 and further optionally includes generating a report that identifies the attempt, the category and the security policy.

Example 20 includes the subject matter of any of Example 12 to Example 19 and further optionally includes monitoring a Hypertext Markup Language 5 (HTML5) web application to detect the attempt, and/or any other web content written in a runtime and/or JIT environment language, including and not limited to Java, JavaScript, C#, and so on, or combinations thereof.

Example 21 is at least one machine-readable medium having instructions that when executed perform the method of any of Example 12 to Example 20.

Example 22 is a system to perform a method of managing security in a web based environment, where the system comprises a local data store; and a local data manager.

Example 23 includes the subject matter of Example 22 and further includes a browser interface to detect an attempt by web content to manipulate data in the local data store; a data management module to classify the data into a category if the data is remotely accessible; and a policy module to apply a security policy to the data based on the category.

Example 24 includes the subject matter of either Example 22 or Example 23 and further includes a separator to separate the data from other data in the local data store based on the category.

Example 25 includes the subject matter of any of Example 22 to Example 24 and further optionally is to select the category from a plurality of categories including one or more of privacy, cryptographic, organization confidentiality specification, and application specific.

Example 26 includes the subject matter of any of Example 22 to Example 25 and further optionally includes a plurality of regions corresponding to the plurality of categories.

Example 27 includes the subject matter of any of Example 22 to Example 26 and further includes a context sensor interface to determine context information for the system.

Example 28 includes the subject matter of any of Example 22 to Example 27 and further optionally is to apply the security policy to the data further based on the context information.

Example 29 includes the subject matter of any of Example 22 to Example 28 and further optionally is to receive user input and apply the security policy to the data further based on the user input.

Example 30 includes the subject matter of any of Example 22 to Example 29 and further includes a hardware security element.

Example 31 includes the subject matter of any of Example 22 to Example 30 and further optionally is to instruct a hardware security element to encrypt the data in the local data store.

Example 32 includes the subject matter of any of Example 22 to Example 31 and further optionally includes generating a report that identifies the attempt, the category and the security policy.

Example 33 includes the subject matter of any of Example 22 to Example 32 and further optionally includes to monitoring a Hypertext Markup Language 5 (HTML5) web application to detect the attempt, and/or any other web content written in a runtime and/or JIT environment language, including and not limited to Java, JavaScript, C#, and so on, or combinations thereof.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size may be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention may be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or rewriteable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc.

may be used herein only to facilitate discussion, and carry no particular temporal or chronological significance unless otherwise indicated. Additionally, it is understood that the indefinite articles "a" or "an" carry the meaning of "one or more" or "at least one".

Those skilled in the art will appreciate from the foregoing description that the broad techniques of the embodiments of the present invention may be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. An apparatus comprising:
   data management logic, implemented at least partly in hardware, to:
      make an identification of stored data in a local data store of the apparatus as being remotely accessible by web content before the stored data is labeled as being a particular type of remotely accessible data; and
      make an original selection, in response to the identification of the stored data in the local data store as being remotely accessible by web content, of a category from a plurality of categories that labels the stored data in the local data store as being a particular type of remotely accessible data;
   a separator to:
      separate the stored data in the local data store from other stored data in the local data store based on the category that labels the stored data in the local data store and another category from the plurality of categories that labels the other stored data in the local data store as being another particular type of remotely accessible data by web content, wherein the local data store is to include a first partition for the category and a second partition for the other category; and
      separate the stored data and the other stored data in the local data store from other further stored data in the local data store that is to be identified as not being remotely accessible by web content, wherein the local data store is include a third partition for the other further stored data to be identified as not being remotely accessible;
   a browser interface to make a detection of an attempt to access the stored data in the local data store by web content received at a browser of the apparatus; and
   policy logic, implemented at least partly in hardware, to apply, in response to the detection of the attempt to access the stored data by the web content received at the browser, a security policy to permit access or to deny access to the stored data in the local data store by the web content received at the browser based on the category that labels the stored data in the local data store as being the particular type of remotely accessible data by web content.

2. The apparatus of claim 1, wherein the category is to include privacy that labels the stored data in the local data store as being privacy data when the stored data includes remotely accessible browsing history data or personal data, cryptographic that labels the stored data in the local data store as being cryptographic data when the stored data includes username information, password information, or challenge information, and application specific that labels the stored data in the local data store as being application specific data when the stored data includes webmail data, retail data, or auction data.

3. The apparatus of claim 1, further including a context sensor interface to determine context information for the apparatus, wherein the context information is to include a geolocation of the apparatus when the attempt is made and a use of the apparatus when the attempt is made, and wherein the security policy is to be applied to permit access or to deny access to the stored data in the local data store by the web content received at the browser further based on the context information.

4. The apparatus of claim 1, wherein the browser interface is to receive user input including a user profile, and wherein the security policy is to be applied to permit access or to deny access to the stored data in the local data store by the web content received at the browser further based on the user input.

5. The apparatus of claim 1, further including a hardware security element to perform an encryption process on the stored data in the local data store.

6. The apparatus of claim 5, wherein the hardware security element is to selectively encrypt or decrypt the data existing in the local data store based on the category that labels the stored data in the local data store as being the particular type of remotely accessible data by web content.

7. The apparatus of claim 1, wherein the data management logic is further to generate a report that identifies the attempt to access the stored data in the local data store by the web content received at the browser, the category that labels the stored data in the local data store as being the particular type of remotely accessible data by web content, and the security policy to permit access or to deny access to the stored data in the local data store by the web content received at the browser based on the category that labels the stored data in the local data store as being the particular type of remotely accessible data by web content.

8. The apparatus of claim 1, wherein the browser interface is to monitor a Hypertext Markup Language 5 (HTML5) web application to detect the attempt to access the stored data in one or more of an HTML5 Web Storage of the apparatus or an HTML5 Application Cache of the apparatus.

9. A method comprising:
   making an identification of stored data in a local data store of an apparatus as being remotely accessible by web content before the stored data is labeled as being a particular type of remotely accessible data;
   making an original selection, in response to the identification of the stored data in the local data store as being remotely accessible by web content, of a category from a plurality of categories that labels the stored data in the local data store as being a particular type of remotely accessible data by web content;
   separating the stored data in the local data store from other stored data in the local data store based on the category that labels the stored data in the local data store and another category from the plurality of categories that labels the other stored data in the local data store as being another particular type of remotely accessible data by web content;
   separating the stored data and the other stored data in a local data store from other further stored data in the local data store that is identified as not being remotely accessible by web content;
   making a detection of an attempt to access the stored data in the local data store by web content received at a browser of the apparatus; and applying, in response to the detection of the attempt to access the stored data by the web content received at the browser, a security policy to permit access or to deny access to the stored data in the local data store by the web content received at the browser based on the category that labels the stored data in the local data store as being the particular type of remotely accessible data by web content.

10. The method of claim 9, wherein the category includes one or more of privacy that labels the stored data in the local data store as being privacy data, cryptographic that labels the stored data in the local data store as being cryptographic data, and application specific that labels the stored data in the local data store as being application specific data.

11. The method of claim 9, further including determining context information for a device containing the local data store, wherein the context information includes one or more of a geolocation of the device when the attempt is made and a use of the device when the attempt is made, and wherein the security policy is applied to permit access or to deny access to the stored data in the local data store by the web content received at the browser further based on the context information.

12. The method of claim 9, further including receiving user input, wherein the security policy is applied to permit access or to deny access to the stored data in the local data store by the web content received at the browser further based on the user input.

13. The method of claim 9, further including instructing a hardware security element to perform an encryption process on the stored data in the local data store.

14. The method of claim 9, further including generating a report that identifies the attempt to access the stored data in the local data store by the web content received at the browser, the category that labels the stored data in the local data store as being the particular type of remotely accessible data by web content, and the security policy to permit access or to deny access to the stored data in the local data store by the web content received at the browser based on the category that labels the stored data in the local data store as being the particular type of remotely accessible data by web content.

15. The method of claim 9, wherein detecting the attempt includes monitoring a Hypertext Markup Language 5 (HTML5) web application.

16. At least one non-transitory computer readable storage medium comprising a set of instructions which, when executed by a processor, cause a device to:
make an identification of stored data in a local data store of an apparatus as being remotely accessible by web content before the stored data is labeled as being a particular type of remotely accessible data;
make an original selection, in response to the identification of the stored data in the local data store as being remotely accessible by web content, of a category from a plurality of categories that labels the stored data in the local data store as being a particular type of remotely accessible data by web content;
separate the stored data in the local data store from other stored data in the local data store based on the category that labels the stored data in the local data store and another category from the plurality of categories that labels the other stored data in the local data store as being another particular type of remotely accessible data by web content;
separate the stored data and the other stored data in a local data store from other further stored data in the local data store that is to be identified as not being remotely accessible by web content;
make a detection of an attempt to access the stored data in the local data store by web content received at a browser of the apparatus; and
apply, in response to the detection of the attempt to access the stored data by the web content received at the browser, a security policy to permit access or to deny access to the stored data in the local data store by the web content received at the browser based on the category that labels the stored data in the local data store as being the particular type of remotely accessible data by web content.

17. The at least one computer readable storage medium of claim 16, wherein the category is to include one or more of privacy that labels the stored data in the local data store as being privacy data, cryptographic that labels the stored data in the local data store as being cryptographic data, and application specific that labels the stored data in the local data store as being application specific data.

18. The at least one computer readable storage medium of claim 16, wherein the instructions, when executed, cause the device to determine context information for the device, wherein the context information is to include one or more of a geolocation of the device when the attempt is made and a use of the device when the attempt is made, and wherein the security policy is to be applied to permit access or to deny access to the data in the stored local data store by the web content received at the browser further based on the context information.

19. The at least one computer readable storage medium of claim 16, wherein the instructions, when executed, cause the device to receive user input, and wherein the security policy is to be applied to permit access or to deny access to the stored data in the local data store by the web content received at the browser further based on the user input.

20. The at least one computer readable storage medium of claim 16, wherein the instructions, when executed, cause the device to instruct a hardware security element to perform an encryption process on the stored data in the local data store.

21. The at least one computer readable storage medium of claim 16, wherein the instructions, when executed, cause the device to generate a report that identifies the attempt to access the stored data in the local data store by the web content received at the browser, the category that labels the stored data in the local data store as being the particular type of remotely accessible data by web content, and the security policy to permit access or to deny access to the stored data in the local data store by the web content received at the browser based on the category that labels the stored data in the local data store as being the particular type of remotely accessible data by web content.

22. The at least one computer readable storage medium of claim 16, wherein the instructions, when executed, cause the device to monitor a Hypertext Markup Language 5 (HTML5) web application to detect the attempt.

* * * * *